United States Patent [19]
Nagata et al.

[11] Patent Number: 5,652,004
[45] Date of Patent: Jul. 29, 1997

[54] PROCESS FOR THE PRODUCTION OF FERMENTING MATERIALS

[75] Inventors: Sadao Nagata; Shigeru Endo, both of Ohimachi; Keiichi Kishi, Tokyo, all of Japan

[73] Assignee: Nisshin Flour Milling Co., Ltd., Tokyo, Japan

[21] Appl. No.: 542,845

[22] Filed: Oct. 13, 1995

[30] Foreign Application Priority Data

Oct. 28, 1994 [JP] Japan .................. 6-264753

[51] Int. Cl.$^6$ .............. A23L 1/10; A23L 1/105; A23L 3/16

[52] U.S. Cl. .............. 426/44; 426/49; 426/511; 426/518

[58] Field of Search ............... 426/18, 44, 61, 426/589, 46, 49, 60, 511, 518

[56] References Cited

FOREIGN PATENT DOCUMENTS

| | | |
|---|---|---|
| 0640294 | 3/1995 | European Pat. Off. . |
| 50-71900 | 6/1975 | Japan . |
| 50-94195 | 7/1975 | Japan . |
| 51-38496 | 3/1976 | Japan . |
| 54-37894 | 3/1979 | Japan . |
| 62-239965 | 10/1987 | Japan . |
| WO-A-9528853 | 11/1995 | WIPO . |

OTHER PUBLICATIONS

Yasushi Yamamoto, New Shiro–Shoyu Manufacturing Used the Wheat Gluten; Journal of Japan Soy Sauce Research Institute, vol. 4, No. 6, pp. 227–232, Nov. 25, 1978.

Database WPI, Section CH, Week 8727, Derwent Publications Ltd., London, GB; Class D16, AN 87–189049 & JP-A-62 118 880 (Nisshin Flour Mill KK), 30 May 1987, abstract.

Database WPI, Section Ch, Week 9301, Derwent Publications Ltd., London, GB; Class D13, AN 93–006744 & KR-B-9 201 203 (Suncheon Food Co.), 6 Feb. 1992, abstract.

Patent Abstracts of Japan, vol. 005 No. 102 (C–061), Jul. 2, 1981 & JP-A-56 042562 (Ajinomoto Co. Inc.), Apr. 20, 1981, abstract.

Database WPI, Section Ch, Week 7841, Derwent Publications Ltd., London, GB; Class D13, AN 78–73831A & JP-A-50 094 195 (Kikkoman Shoyu KK), Jul. 26, 1975, abstract.

*Primary Examiner*—Arthur L. Corbin
*Attorney, Agent, or Firm*—Oblon, Spivak, McClelland, Maier & Neustadt, P.C.

[57] ABSTRACT

Disclosed is a process for the production of a fermenting material which comprises using 5–100% by weight of a dried gluten product and 95–0% by weight of wheat as a raw material, adding steam to the material so as to adjust the moisture content of the material to within a range of 12–18%, and granulating followed by steaming.

7 Claims, No Drawings

PROCESS FOR THE PRODUCTION OF FERMENTING MATERIALS

FIELD OF THE INVENTION

This invention relates to a process for the production of a fermenting material for use in the manufacture of fermented products such as soy sauce, miso, seasoning and the like. More particularly, the invention relates to a process for the production of a fermenting material which makes it possible to produce a light-coloured, fermented products with good body, good taste and excellent flavor.

BACKGROUND OF THE INVENTION

The prior processes using wheat gluten as a fermenting material are disclosed in Japanese Patent Kokai 50-71900, 51-38496, 54-37894 and 62-239965, which are all directed to the treatment of wheat gluten by an added water-steaming process as is done for soybean. However, added water provides wheat gluten with a specific viscoelasticity not observed in other materials, which makes it troublesome to operate a thermal denaturation subsequent to water addition. In "Journal of Japan Soy Sauce Research Institute, vol. 4, No. 6, pp. 227–232, Nov. 25, 1978" issued by Japan Soy Sauce Research Institute, it is reported therein that koji prepared by adding water to wheat gluten, steaming, mixing with steamed rice and cultivating a koji mold therein, will form a mass which presents a problem in the development of a koji mold into gluten.

Accordingly, it is conventional that the above problem has been dealt with by a process of adding small amounts of wheat gluten to the surface of the water-added soybean and steaming or a process of adding gluten to moromi without a koji-making.

However, the process of adding wheat gluten to moromi has the problem that addition of insufficiently denaturated gluten to moromi makes the enzymatic digestion property very poor and causes insufficient denaturation of protein.

As the technique to apply gluten for koji-making, Japanese Patent Kokai 50-94195 discloses a process of adding water to a mixture of a starchy material powder and wheat gluten to form a dough, steaming and granulating the dough to give a koji-making material. However, this process involves the problems in which (i) steaming the mixture in the form of a dough mass may provide poor thermal conductivity, non-uniformity in thermal denaturation and a reduced total nitrogen utilization ratio, (ii) formation of dough by kneading the mixture with added water may produce a highly viscous product which, even when granulated, will form a mass in koji-making to putrefy koji, (iii) the granulated product after dough formation has a sheet-like surface, which results in no development of koji mold into the dough, thus reducing in the enzymatic activity of koji and no extaction of flavor enhancers.

DETAILED DESCRIPTION OF THE INVENTION

The present inventors have made extensive studies to overcome the above problems encountered in the prior art and were successful in the production of a fermenting material having good koji making capability, which makes it possible to produce a light-coloured, fermented product with good body, good taste and excellent flavor.

According to the present invention, there is provided a process for the production of a fermenting material which comprises using 5–100% by weight of a dried gluten product and 95–0% by weight of wheat as a raw material, adding steam to the material so as to adjust a moisture content upon granulating within a range of 12–18%, and granulating followed by steaming.

The dried gluten products used in the invention include dried wheat gluten products, dried corn gluten products and the like. In particular, dried wheat gluten products are preferably used. The dried wheat gluten products include vital gluten powder, dry gluten and the like.

The wheat used in the invention may be either wheat grains or wheat flour. In particular, the milled wheat grains from which bran coat is removed are preferable.

In the invention, 5–100% by weight of the dried gluten product and 95–0% by weight of wheat are used as a raw material. In other words, the dried gluten products can be used singly or in combination with wheat in the correspondingly indicated proportion.

In this invention, it is extremely important in the achievement of the intended purpose that without addition of water, steam is added directly to the raw material so as to adjust a moisture content upon granulating within the range of 12–18%.

Below is mentioned the reason why it is required that without addition of water, steam is added directly to the raw materials such as the dried gluten product alone or a mixture of the dried gluten product and wheat so as to adjust the moisture content upon granulating within the range of 12–18%.

Wet gluten containing a sufficient amount of water has a strongly sticky, gum property. In particular, the vital gluten powder hardly undergoes a thermal denaturation, so that this powder will exert the above property remarkably when water is added. Even dry gluten in the pored sheet shape, having insufficient thermal denaturation, will exert a considerable level of stickiness when water is added. In this situation, adding water to those dried gluten products or adding those dried gluten products to a water-added, defatted soybean, followed by steaming will result in the formation of a completely massive block which cannot be disintegrated at all by a disintegrator due to its viscoelasticity. When such massive block is applied for koji-making with other materials, it will form a larger mass which may cause easily putrefaction of koji. Therefore, it should be avoided to add water directly to those raw materials in the present invention.

If a moisture content on granulation is beyond 18%, gluten becomes sticky and as a result, granulation is not possible, subsequent steaming will become very difficult to operate, a uniform thermal denaturation is not possible, and further the materials will become massive at the time of koji making and as a result koji will be putrefied. If the moisture content on granulation is less than 12%, granulation could not be accomplished, so that the dried gluten product when subjected to steaming will become massive because of a large amount of condensed water adhered onto the product, which leads to the similar results as discussed above, and the object of this invention cannot be achieved. Even if granulation is attempted at a moisture content of 12–18% using wheat alone, without admixture with the dried gluten products, granulation is not possible, thus giving similar results as discussed above with no achievement of the object of this invention.

Granulation or pelleting is preferably carried out using a conventional granulating machine such as a pellet mill to form granulates or pellets each having a diameter of about 2–10 mm.

In this invention, steaming of the granulated product is carried out in a high pressure vessel at a gauge pressure of at least 1.0 kg/cm$^2$ for at least 2 minutes, which gives particularly favourable results in the achievement of satisfactory denaturation of protein.

The gluten as treated in this manner is completely deactivated, causes loss of stickiness and undergoes a sufficient thermal denaturation of protein. Then the treated gluten is suitably ground, charged with added water so as to give a charging moisture content of 35–50% and used for further koji-making, which gives no difficulty in any work. Due to swell characteristics of gluten, the treated gluten has a superior depositability and is very suitable for aeration koji-making. The treated gluten, when blended with heat-treated soybeans, exhibits a similar superior koji-making effect.

Thus, a koji product prepared using the fermenting materials of this invention can possess higher protease and glutaminase activities as an amount of the gluten used is increased.

In the production of a soy sauce, the koji product is charged with an aqueous solution of common salt as in a usual manner, subjected to a usual control of moromi production at 10°–30° C. for 2–5 months for fermentation and maturing, and then squeezed to prepare the soy sauce. In the manufacture of a soy sauce-like seasoning liquor, the koji product is charged with water or an aqueous solution of common salt, subjected to a usual control of moromi production at 20°–60° C. for a period of 3 days to 5 months for decomposition and maturing, then filtered or squeezed to prepare the seasoning liquor. The soy sauce and seasoning liquor thus prepared have high contents of nitrogen and glutamic acid, a light color and a very good flavor.

This invention is further illustrated by the following examples.

EXAMPLE 1

Steam was directly added to 2400 g of vital gluten powder. The thus treated vital gluten was molded at a moisture content of 12.1% to cylindrical pellets each having a diameter of 4 mm by means of a pellet mill, steamed in a high pressure vessel with a saturated steam at a gauge pressure of 2 kg/cm$^2$ for 3 minutes, cooled and ground to give a fermenting material. To the fermenting material was added water to give a moisture content of 45%, a seed koji was inoculated, koji-making was then continued at 25°–35° C. for 43 hours to produce a soy sauce koji product. The koji product was charged together with 4640 ml of a 23% aqueous solution of common salt, fermented at 15°–30° C. for 4 months, squeezed and pasteurized at 60° C. for 3 hours to prepare a soy sauce.

The soy sauce thus prepared had a light color, a very good taste and an excellent flavor.

EXAMPLE 2

Steam was added directly to a mixture of 1000 g of vital gluten powder and 1000 g of wheat flour, the treated mixture was molded at a moisture content of 17.5% to cylindrical pellets each having a diameter of 6 mm by means of a pellet mill, steamed in a high pressure vessel with a saturated steam at a gauge pressure of 1.5 kg/cm$^2$ for 10 minutes, cooled and ground to give a fermenting material. Separately, 2400 ml of water was added to 2000 g of defatted soybean which was then treated in a high pressure vessel with a saturated steam at a gauge pressure of 2.0 kg/cm$^2$ for 10 minutes to obtain a steamed soybean. The steamed soybean was mixed with the fermenting material and to a mixture was added water to give a moisture content of 45%. After inoculation of a seed koji, koji-making was continued at 25°–35° C. for 43 hours to give a soy sauce koji product. The koji product was charged together with 7200 ml of a 23% aqueous solution of common salt, fermented at 15°–30° C. for 4 months and squeezed to give a raw soy sauce. This raw soy sauce was pasteurized at 60° C. for 3 hours.

The soy sauce thus prepared had a light color, a very good taste and further an excellent flavor.

EXAMPLE 3

To a mixture of 70 g of vital gluten powder and 1330 g of wheat flour was directly added steam, the treated mixture was molded at a moisture content of 13.2% to cylindrical pellets each having a diameter of 2 mm by means of a pellet mill, steamed in a high pressure vessel with a saturated steam at a gauge pressure of 1.0 kg/cm$^2$ for 15 minutes, cooled and ground to give a fermenting raw material. Separately, 720 ml of water were added to 600 g of defatted soybean which was then treated in a high pressure vessel with a saturated steam at a gauge pressure of 1.5 kg/cm$^2$ for 10 minutes to give a steamed soybean. The steamed soybean was mixed with the fermenting material prepared as above, to a mixture was added water so as to provide a moisture content of 40%. After inoculation of a seed koji, koji-making was continued at 25°–35° C. for 43 hours to produce a koji product. The koji product was charged together with 3400 ml of a 23% aqueous solution of common salt, decomposed at 45° C. for one week and squeezed to give a soy sauce-like seasoning liquor.

The seasoning liquor thus prepared had a light color, a very good taste and further an excellent flavor.

EXAMPLE 4

Steam was added directly to a mixture of 1000 g of vital gluten powder and 1000 g of wheat flour, the treated mixture was molded at a moisture content of 12.2% to cylindrical pellets each having a diameter of 8 mm by means of a pellet mill, steamed in a high pressure vessel with a saturated steam at a gauge pressure of 1.0 kg/cm$^2$ for 15 minutes, cooled and ground to give a fermenting material. Separately, 720 ml of water was added to 600 g of defatted soybean which was then treated in a high pressure vessel with a saturated steam at a gauge pressure of 1.5 kg/cm$^2$ for 10 minutes to give a steamed soybean. The steamed soy bean was mixed with the fermenting material obtained as above and to a mixture was added water to give a moisture content of 42.5%. After inoculation of a seed koji, koji-making was continued at 25°–35° C. for 43 hours to give a koji product. The koji product was charged together with 3400 ml of a 18% aqueous solution of common salt, decomposed at 30° C. for one week and squeezed to give a soy sauce-like seasoning liquor.

The seasoning liquor thus prepared had a light color, a very good taste and further an excellent flavor.

EXAMPLE 5

Steam was added directly to a mixture of 800 g of vital gluten powder and 200 g of wheat flour, the treated mixture was molded at a moisture content of 17.8% to cylindrical pellets each having a diameter of 4 mm by means of a pellet mill, steamed in a high pressure vessel with a saturated steam at a gauge pressure of 1.0 kg/cm$^2$ for 15 minutes, cooled and ground to give a fermenting material. Water was added to the fermenting material so as to give a moisture content of 45%. After inoculation of a seed koji, koji-making was continued at 25°–35° C. for 43 hours to obtain a koji product. Separately, 600 g of the whole soybean which had been sprayed with water overnight and drained off, was treated in a high pressure vessel with a saturated steam at a gauge pressure of 1.8 kg/cm² for 5 minutes to give a steamed whole soybean. To the steamed soybean was added the koji product, the resulting mixture was charged together with 480 g of common salt and 2000 ml of water and then fermented at 30° C. for 3 months to give a miso.

The miso thus prepared had a light color, a very good taste and further an excellent flavor.

COMPARATIVE EXAMPLE 1

Steam was added directly to 1000 g of vital gluten powder which was then molded at a moisture content of 20.2% to cylindrical pellets each having a diameter of 10 mm by means of a pellet mill and steamed in a high pressure vessel with a saturated steam at a gauge pressure of 1.8 kg/cm². After grinding, water was added so as to give a moisture content of 45%, a seed koji was inoculated and then koji-making was continued at 25°–35° C. for 43 hours to give a koji product. The koji product was charged together with 1800 ml of a 23% aqueous solution of common salt, fermented at 15°–30° C. for 4 months and squeezed to give a raw soy sauce. This soy sauce was pasteurized at 60° C. for 3 hours.

The soy sauce thus prepared had a somewhat dark color, a less taste and a poor flavor.

TEST EXAMPLE 1

The soy sauces and seasoning liquors prepared in Examples 1–4 and Comparative Example 1 were determined for the total nitrogen utilization ratio, glutamic acid content per nitrogen unit (Glu/TN), JAS Color Number and denaturation of protein. The results are shown in Table 1, wherein the sign "+" means that any precipitate due to insufficient denaturation of protein is found in the produced seasoning liquors after boiling those liquors on a water bath, which results in a less product value, the sign "−" means sufficient denaturation of protein, "TN" stands for total nitrogen and "Glu" does glutamic acid.

TABLE 1

| | Total nitrogen utilization ratio (%) | Glu/TN (mg/g) | JAS Color No. | Denaturation of protein |
|---|---|---|---|---|
| Example 1 | 92.5 | 1430 | 46 | − |
| Example 2 | 91.5 | 1080 | 40 | − |
| Example 3 | 88.2 | 890 | 48 | − |
| Example 4 | 90.6 | 1120 | 45 | − |
| Comparative Example 1 | 83.5 | 745 | 34 | + |

TEST EXAMPLE 2

Following the same procedure as described in Example 1, each raw material indicated in the following Table 2 to which was directly added steam, was granulated at the indicated moisture content and then steamed to obtain the thermally treated gluten, the thermally treated wheat flour or a mixture thereof. Subsequently, water was added to the thus treated material so as to give a charging moisture content of 42.5% and a seed koji was then inoculated. Koji-making was continued at 25°–35° C. for 43 hours. Each koji product thus prepared was charged with 2000 ml of a 23% aqueous solution of common salt, fermented and matured at 20°–25° C. for 3 months and then squeezed to produce a raw soy sauce. Granulation ability, koji-making ability, denaturation of protein and total nitrogen utilization ratio of the soy sauce thus prepared were determined and evaluated. The results are shown in Table 2. In the table, the signs "+" and "−" indicate the same meaning as in Table 1. In the columns of "granulation ability" and "koji-making ability", each sign means X: Defective
Δ: Somewhat defective, but acceptable
○: Good
⊙: Very good In the column of "total evaluation", each sign means
X: Not accepted
○: Accepted (Granulation ability=Δ or higher; koji-making ability=○ or higher; sufficient denaturation of protein; and total nitrogen utilization ratio=80% or higher)
⊙: Accepted Products, especially having a total nitrogen utilization ratio of 88% or higher

TABLE 2

| Lot No. | Raw material Vital gluten (g) | Wheat flour (g) | Moisture content (*) | Granulation ability | Koji-making ability | Denaturation of protein | Total nitrogen utilization ratio (%) | Total evaluation |
|---|---|---|---|---|---|---|---|---|
| 1 | 0 | 1000 | 10 | X | X | + | 74.5 | X |
| 2 | 0 | 1000 | 12 | X | X | + | 76.0 | X |
| 3 | 0 | 1000 | 14 | X | X | + | 78.1 | X |
| 4 | 0 | 1000 | 16 | X | X | + | 78.6 | X |
| 5 | 0 | 1000 | 18 | X | X | + | 78.0 | X |
| 6 | 0 | 1000 | 20 | ○ | ○ | − | 77.5 | X |
| 7 | 50 | 950 | 10 | X | X | + | 79.0 | X |
| 8 | 50 | 950 | 12 | Δ | ○ | − | 85.0 | ○ |
| 9 | 50 | 950 | 14 | ⊙ | ○ | − | 86.8 | ○ |
| 10 | 50 | 950 | 16 | ⊙ | ○ | − | 87.2 | ○ |
| 11 | 50 | 950 | 18 | ○ | ○ | − | 86.1 | ○ |
| 12 | 50 | 950 | 20 | X | X | + | 79.5 | X |
| 13 | 500 | 500 | 10 | X | X | + | 76.5 | X |
| 14 | 500 | 500 | 12 | ○ | ○ | − | 85.1 | ○ |

TABLE 2-continued

| Lot No. | Raw material | | | Granulation ability | Koji-making ability | Denaturation of protein | Total nitrogen utilization ratio (%) | Total evaluation |
|---|---|---|---|---|---|---|---|---|
| | Vital gluten (g) | Wheat flour (g) | Moisture content (*) | | | | | |
| 15 | 500 | 500 | 14 | ◎ | ◎ | — | 87.2 | ○ |
| 16 | 500 | 500 | 16 | ◎ | ◎ | — | 88.5 | ◎ |
| 17 | 500 | 500 | 18 | ◎ | ◎ | — | 90.6 | ◎ |
| 18 | 500 | 500 | 20 | X | X | + | 78.5 | X |
| 19 | 1000 | 0 | 10 | X | X | + | 78.9 | X |
| 20 | 1000 | 0 | 12 | ◎ | ◎ | — | 85.2 | ○ |
| 21 | 1000 | 0 | 14 | ◎ | ◎ | — | 88.6 | ◎ |
| 22 | 1000 | 0 | 16 | ◎ | ◎ | — | 92.5 | ◎ |
| 23 | 1000 | 0 | 18 | ○ | ○ | — | 90.6 | ◎ |
| 24 | 1000 | 0 | 20 | X | X | + | 81.6 | X |

Table 2 clearly shows that superior koji-making ability and an improved total nitrogen utilization ratio can be produced by using 100% vital gluten or a mixture of gluten containing not less than 5% of vital gluten and wheat as a raw material, adjusting a moisture content on granulation within the range of 12–18% by addition of steam, granulating, steaming and subjecting to koji-making.

The fermenting materials prepared by the process of this invention have a superior koji-making ability and a higher total nitrogen utilization ratio. Accordingly, use of those fermenting materials can produce the fermented products having a light color (JAS Color Number of No. 35 or more), a higher total nitrogen utilization ratio of not less than 80%, a very good taste and an excellent flavor.

What is claimed is:

1. A process for the production of a fermenting material which comprises the steps of adding steam to a mixture comprising 5–100% by weight of a dried gluten product and 95–0% by weight of wheat to adjust the moisture content of the mixture to within a range of 12–18%, granulating the moistened mixture and subjecting the granulated mixture to steam treatment.

2. The process of claim 1 wherein the dried gluten product is a dried wheat gluten product or a dried corn gluten product.

3. The process of claim 2 wherein the dried wheat gluten product is vital gluten powder or dry gluten.

4. The process of claim 1 wherein the fermenting material comprises 100% of dried gluten product.

5. The process of claim 1 wherein the dried gluten product is used in combination with wheat.

6. The process of claim 1 wherein steam is added directly to the raw material without addition of water prior to granulation.

7. The process of claim 1 wherein the steam treatment is performed in a high pressure vessel at a gauge pressure of at least 1.0 kg/cm$^2$ for at least 2 minutes.

* * * * *